United States Patent
Ho et al.

(10) Patent No.: US 7,764,745 B2
(45) Date of Patent: Jul. 27, 2010

(54) COMMUNICATION SYSTEM AND METHOD FOR SELECTING CODEWORD THEREOF

(75) Inventors: Chung-Lien Ho, Taoyuan County (TW); Ta-Sung Lee, Hsinchu (TW)

(73) Assignee: Industrial Technology Research Institute, Hsinchu, Taiwan (CN)

( * ) Notice: Subject to any disclaimer, the term of this patent is extended or adjusted under 35 U.S.C. 154(b) by 779 days.

(21) Appl. No.: 11/710,503

(22) Filed: Feb. 26, 2007

(65) Prior Publication Data

US 2008/0069054 A1    Mar. 20, 2008

(30) Foreign Application Priority Data

Sep. 18, 2006    (TW) .................................. 95134428

(51) Int. Cl.
*H04B 7/02*    (2006.01)
*H04L 1/02*    (2006.01)

(52) U.S. Cl. .................. 375/267; 375/260; 375/299; 375/347; 375/349; 455/500; 455/504; 455/506; 455/101

(58) Field of Classification Search ................. 375/267, 375/260, 299, 347, 349; 370/278, 208, 210; 455/500, 501, 101, 504–506
See application file for complete search history.

(56) References Cited

U.S. PATENT DOCUMENTS

| | | | |
|---|---|---|---|
| 6,178,196 B1 | 1/2001 | Naguib et al. | |
| 6,549,585 B2 | 4/2003 | Naguib et al. | |
| 6,693,982 B1 | 2/2004 | Naguib et al. | |
| 6,748,024 B2 | 6/2004 | Kuchi et al. | |
| 6,816,557 B2 | 11/2004 | Kuchi et al. | |
| 6,865,237 B1 | 3/2005 | Boariu et al. | |
| 2005/0020237 A1 | 1/2005 | Alexiou et al. | |
| 2005/0047517 A1 | 3/2005 | Georgios et al. | |
| 2005/0068909 A1* | 3/2005 | Chae et al. .................. | 370/278 |
| 2006/0067419 A1 | 3/2006 | Sandhu | |
| 2006/0159195 A1 | 7/2006 | Ionescu et al. | |
| 2006/0182196 A1 | 8/2006 | Shashidhar et al. | |
| 2007/0297529 A1* | 12/2007 | Zhou et al. .................. | 375/267 |

FOREIGN PATENT DOCUMENTS

TW    200703924 A    1/2007

OTHER PUBLICATIONS

Ho, Chung-Lien, "Space-Time Signal Processing for MMO Wireless Communications: Space-Time Signaling and Interference Suppression," A Dissertation Submitted to Institute of Communication Engineering College of Electrical Engineering and Computer Science, National Chiao Tung University, No. 95134428, p. 123-159. (Unknown date).

* cited by examiner

*Primary Examiner*—Phuong Phu
(74) *Attorney, Agent, or Firm*—Birch, Stewart, Kolasch & Birch, LLP (57) ABSTRACT

A method for selecting a codeword in a multi-input multi-output (MIMO) communication system is disclosed. The method comprises steps providing a transmitter with codeword. A receiver receives the codeword candidates and calculates the corresponding bit error rate (BER) according to a decoding strategy. The receiver chooses a codeword candidate which has a minimum BER value and sends a selection signal to the transmitter. And, a transmitter determines a codeword for data transmission according to the selection signal.

22 Claims, 9 Drawing Sheets

$$F = \begin{bmatrix} \alpha_1 I_k & O(K) & \cdots & O(K) \\ O(K) & \alpha_2 I_k & & O(K) \\ \vdots & \vdots & \ddots & \vdots \\ O(K) & O(K) & \cdots & \end{bmatrix}$$

COMMUNICATION SYSTEM AND METHOD FOR SELECTING CODEWORD THEREOF

BACKGROUND OF THE INVENTION

1. Field of the Invention

The invention relates to a multi-input multi-output (MIMO) communication system and codeword selection method of space-time codewords.

2. Description of the Related Art

Due to the need for higher data transmission rate in communication systems, techniques for improving transmission data rate and link quality, such as efficiency coding, modulation and signal processing, are heavily researched. To this end, multi-input multi-output (MIMO) communication systems comprising an array of antennas (i.e. multiple antennas) at both the transmitter and receiver are widely used to promise a significant increase in data rate and link quality without bandwidth expansion and thus capable of meeting the formidable service requirements in the next generation wireless communications. The core scheme of MIMO systems is the space-time coding (STC). The two main functions of STC are the spatial multiplexing (SM) and transmit diversity (TD). By transmitting redundant copies of the signal over different transmit antennas, TD, such as space-time block code (STBC) or space-time trellis code (STTC), can provide the excellent link quality. By transmitting the different data of a signal over different transmit antennas, SM, such as layered space-time code (LSTC) or Bell Labs layered space-time (BLAST) techniques, can acquire the high spectral efficiency.

Figure 1:
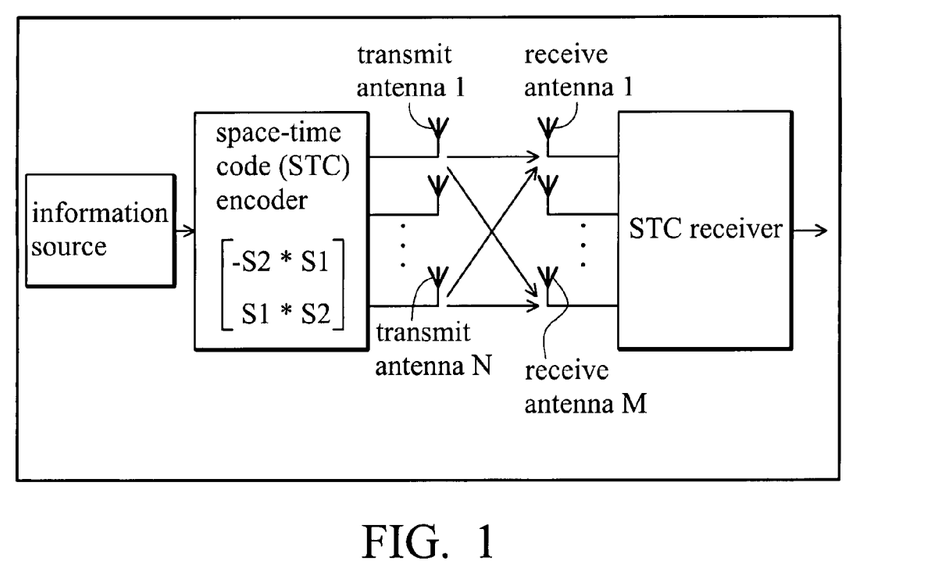
FIG. 1 is a schematic illustration of a conventional system applying a space-time block code.
Figure 2:
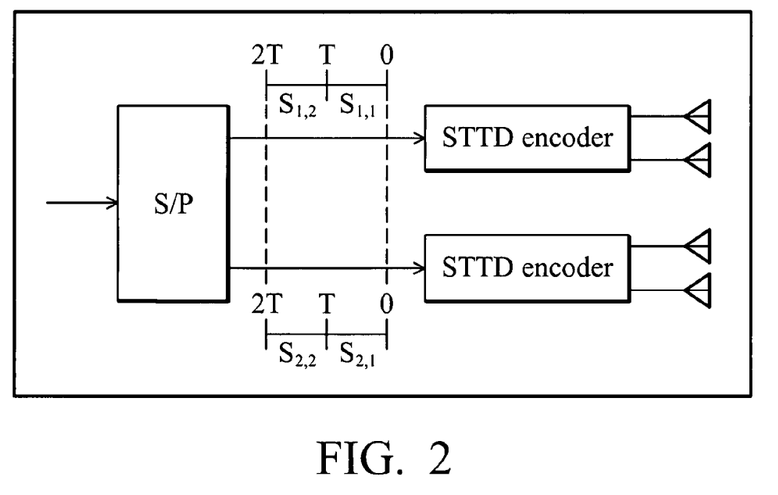
FIG. 2 is a schematic illustration of another conventional system applying another space-time block code.

FIG. 1 shows a conventional system applying a STBC, where two symbols are transmitted over spatial and time domain. FIG. 2 shows another STC technique, combined with Q=2 Alamouti's codes. This technique is referred to as the double space-time transmit diversity (DSTTD). The ST codeword for the DSTTD is $$X := \begin{bmatrix} s_{1,1} & -s_{1,2}^* \\ s_{1,2} & s_{1,1}^* \\ \hline s_{2,1} & -s_{2,2}^* \\ s_{2,2} & s_{2,1}^* \end{bmatrix}$$

where the code rate is R=2 and diversity gain is 2. Although the DSTTD is a simple coding scheme capable of achieving the diversity gain and spatial multiplexing gain simultaneously, however, its decoding scheme is more complex than that of STBC. Moreover, the codeword structure is inflexible, resulting in poor performance.

TD can improve signal link quality, but the spectral efficiency is poor. Alternatively, SM provides a high data transmission rate, but poor protection against the channel fading. Thus, a tradeoff between TD and SM is required to achieve the optimum performance.

It is shown that receiver operations should be simple, so as to provide efficient decoding and offer reduced receiver design complexity. In response to the STC at the transmitter side, the receiver is preferable be capable of decoding the coded signal and performing interference cancellation and signal detection for the received signal.

Although ML detection offers the best performance, its computational complexity is higher than other methods. A reasonable solution between the performance and computational complexity is the ordered successive interference cancellation (OSIC) detection that performs the interference cancellation and signal detection for received signal by sorting and using an operation resultant from a previous iteration. For example, if the signals from mobile user 1 and mobile user 2 are both received by the receiver, the signal from mobile user 1 is detected first and interference therein is cancelled to obtain the signal from mobile user 2 based on the OSIC detection. The computational complexity of OSIC detection is lower than that of ML, but achieves the similar performance.

In a time-varying wireless channel, both the transmitter and receiver require an adjustable transmission strategy for data transmission to handle signal failure in an attempt to achieve the best service quality. Thus, adjustable transmission strategies for data transmission in MIMO systems are desirable.

BRIEF SUMMARY OF THE INVENTION

The invention provides a method for selecting a codeword in a multi-input multi-output (MIMO) communication system. The method comprises the following steps: a transmitter provides codeword candidates; a receiver receives the codeword candidates and calculates the bit error rate (BER) value corresponding to each codeword candidate according to a decoding strategy; the receiver chooses a codeword candidate which has a minimum BER value and sends a selection signal to the transmitter. And a transmitter determines a codeword for data transmission according to the selection signal.

The invention also provides a communication system having multiple transmit antennas and multiple receive antennas. The communication system comprises at least a transmitter and a receiver. The transmitter provides codeword candidates. The receiver receives the codeword candidates and determines bit error rates, each corresponding to one of the codeword candidates according to a decoding strategy. The receiver finds a codeword candidate with the minimum bit error rate and sends a selection signal to the transmitter, and the transmitter determines a codeword for data transmission according to the selection signal.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

An exemplary embodiment of a MIMO communication system and method for codeword selection thereof combining the two concepts of SM and TD techniques simultaneously with arbitrary number of antennas at the transmitter for achieving both the high link quality and high spectrum efficiency (SE) are provided. On the other hand, a group-wise recursion based OSIC detector is developed by incorporating the orthogonal structures of orthogonal space-time block codes (O-STBCs) to further reduce the receiver computational load. Moreover, the flexible G-STBCs are constructed and an optimal codeword structure which achieves the minimum bit error rate (BER) for data transmission is selected with limited feedback information.

The following description is of the best-contemplated mode of carrying out the invention. This description is made for the purpose of illustrating the general principles of the invention and should not be taken in a limiting sense. The scope of the invention is best determined by reference to the appended claims.

Figure 3:
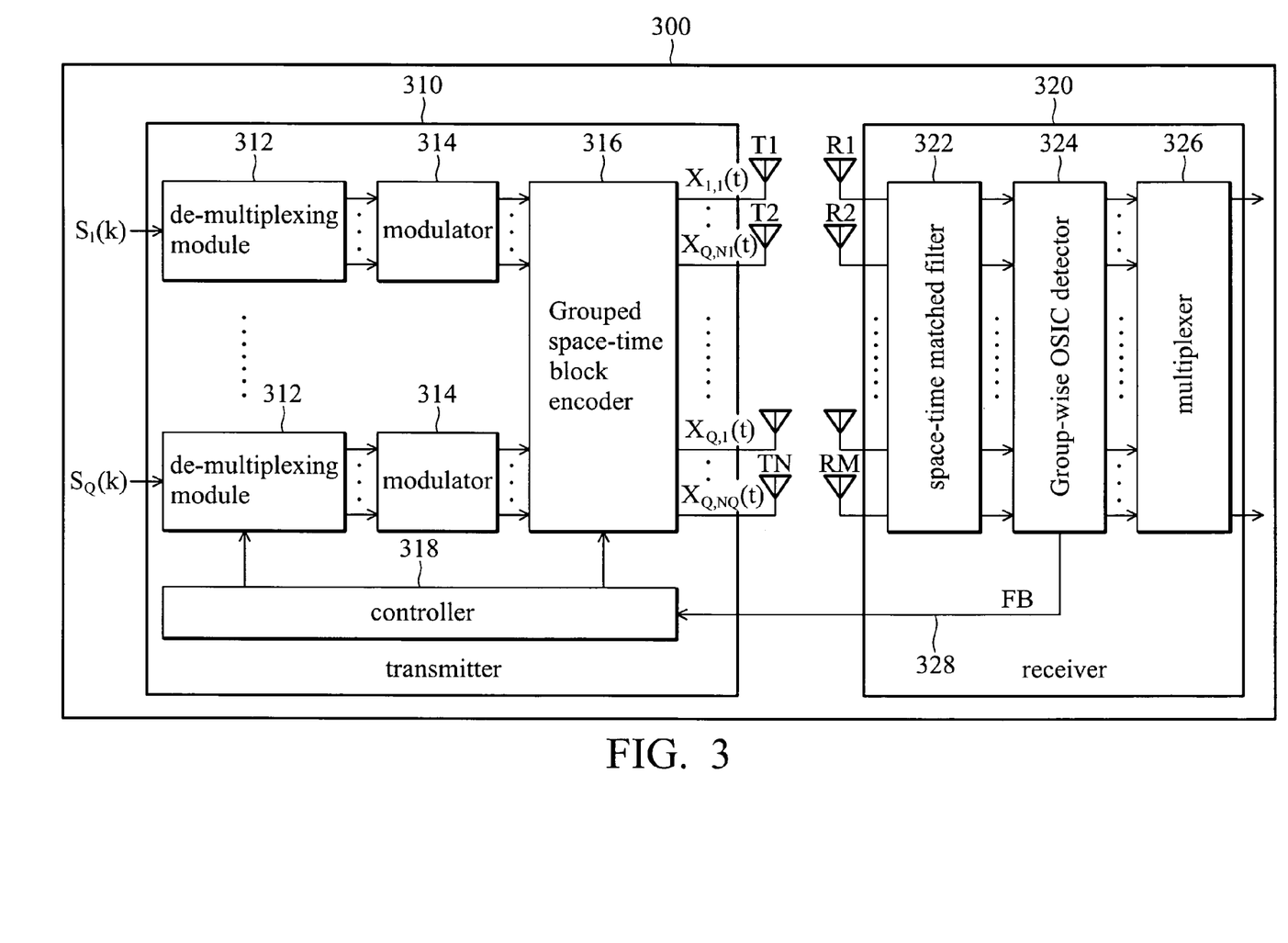
FIG. 3 shows an embodiment of a communication system according to the invention.

FIG. 3 shows an embodiment of a communication system according to the invention. Communication system 300 comprises at least one transmitter 310 and receiver 320. Please note that the communication system, according to the present invention, is a transceiver architecture that has a receiver and a transmitter in a MIMO system. The transmitter 310 comprises a de-multiplexing module 312, a modulator 314, a grouped space-time block code (G-STBC) encoder 316, a controller 318 and N transmit antennas T1~TN. Transmit antennas T1~TN are partitioned into Q antenna groups, each antenna group consisting of two to four antennas. The receiver 320 comprises a space-time code matched filter (MF) 322, a group-wise OSIC detector 324, a multiplexer 326 and M receive antennas R1~RN, wherein M≧Q.

First, at the transmitter side, the de-multiplexing module 312 generates multiple data sub-streams based on input data sources. The data sub-streams are modulated to the data symbols through the modulator 314 and performed by a space-time coding according to a codeword structure chosen by the grouped space-time block code (G-STBC) encoder 316. At last, those encoded data are transmitted to the receiver 328 by transmit antennas T1~TN. In this embodiment, a codeword structure represents number of the antennas used and time for transmitting the data symbols.

Therefore, at the receiver side, the receiver 320 receives the transmitted signals from the transmitter, and decodes the signals by the space-time matched filter 322. The space-time matched filter 322 is a matched filter channel matrix (MFCM) in which the space-time code matched filter 322 can reduce the spatial dimension of the received signals based on the MFCM to perform a further decoding by the group-wise OSIC detector 324. The decoding operations and format of the MFCM will be detailed in below. Next, the group-wise OSIC detector 324 receives the signals after processed by the space-time code matched filter 322, and performs interference cancellation and signal detection based on an OSIC detection scheme. In general, the method of signal detection is related to the modulation method used at the transmitter side. For example, the receiver employs BPSK signal detection or QPSK signal detection if the BPSK modulation or QPSK modulation is used at the transmitter side. In other words, the detection depends on the modulation method used. The decoding of BPSK modulation is related to detection of real-valued symbols and the decoding of QPSK modulation is related to detection of complex-valued symbols. Thus, both detections of real-valued and complex-valued symbols will be discussed and detailed in below.

For example, if the detection is for the real-valued symbols, an antenna group-wise OSIC detection strategy can be performed directly such that all symbols of an antenna group can be detected at the same time at each OSIC iteration. If the detection is for the complex-valued symbols, in addition to the antenna group-wise OSIC detection strategy, other detection strategies, such as two-stage detection or recursive based detection strategy, must be used for signal detection. The reason for doing so is that only a half of the symbols (eg. $L_q$ real-valued symbols) from a unit block with 2 $L_q$ real-valued symbols can be detected simultaneously at each OSIC iteration if the detection is for the complex-valued symbols. In fact, those detected symbols are either a real part (Re) or an imaginary part (Im) of the complex-valued symbols associated with an antenna group. For the antenna group-wise detection of the complex-valued symbols, all the real part (Re) of the symbols associated with an antenna group are averaged with the imaginary part (Im) of the symbols associated with the same antenna group to obtain matrix structures similar with the matrix structures that real-valued symbols had, such that the previously described group-wise OSIC detection strategy can be applied to the detection of the complex-valued symbols.

The first stage of the two-stage detection strategy detects the antenna groups having high link ability, such as $N_q=4$ or $N_q=3$. The second stage of the two-stage detection strategy detects the antenna groups having lower link ability, thus, the computational complexity can be reduced. Recursive based implementation is employed with the two-stage detection strategy which uses the operation result from the previous iteration to determine the detection symbols of the next stage thus reducing computational complexity. With the decoding strategy as previously discussed, the computational and design complexities of the receiver can be simplified.

In addition, in this embodiment, the group-wise OSIC detector 324 calculates or checks a table to determine bit error rates (BER), each corresponding to one of the antenna groups, based on the given environmental parameters. After all the bit error rates have been found, the group-wise OSIC detector 324 detects a first antenna group corresponding to the minimum bit error rate among the bit error rates, and sends a selection signal 328 to the transmitter 310, in which the selection signal 328 having information about the antenna group (i.e., the first antenna group) with the minimum bit error rate.

Based on the previously described group-wise OSIC detection scheme with low computational complexity, a grouped space-time coding can be developed without limiting the total number of antennas. When used under constraints of total transmission power and transmission bit rate limitations, a space-time codeword selection criterion is provided according to the minimum BER performance requirement, thus, an optimal codeword for data transmission is properly selected.

It should be noted that the optimal space-time codeword structure used in the invention depends on the feedback information from the receiver. Thus, the transmitter may initially transmit pilot symbols, each of which representing a specific codeword format, to the receiver. The receiver receives the pilot symbols, calculates bit error rates corresponding to the pilot symbols and locates a codeword corresponding to the minimum bit error rates among the bit error rates. The transmitter and the receiver then use the codeword structure corresponding to the minimum BER for actual data transmission. Because several codeword structures can be selected for data transmission at the transmitter side, it can also be designed that the receiver is required to select another codeword structure corresponding to a smaller BER for data transmission by transmitting a re-selection signal from the transmitter when the transmission performance is low or the environment requires change. Thus, a proper adjustable strategy for data transmission is provided.

Figure 4:
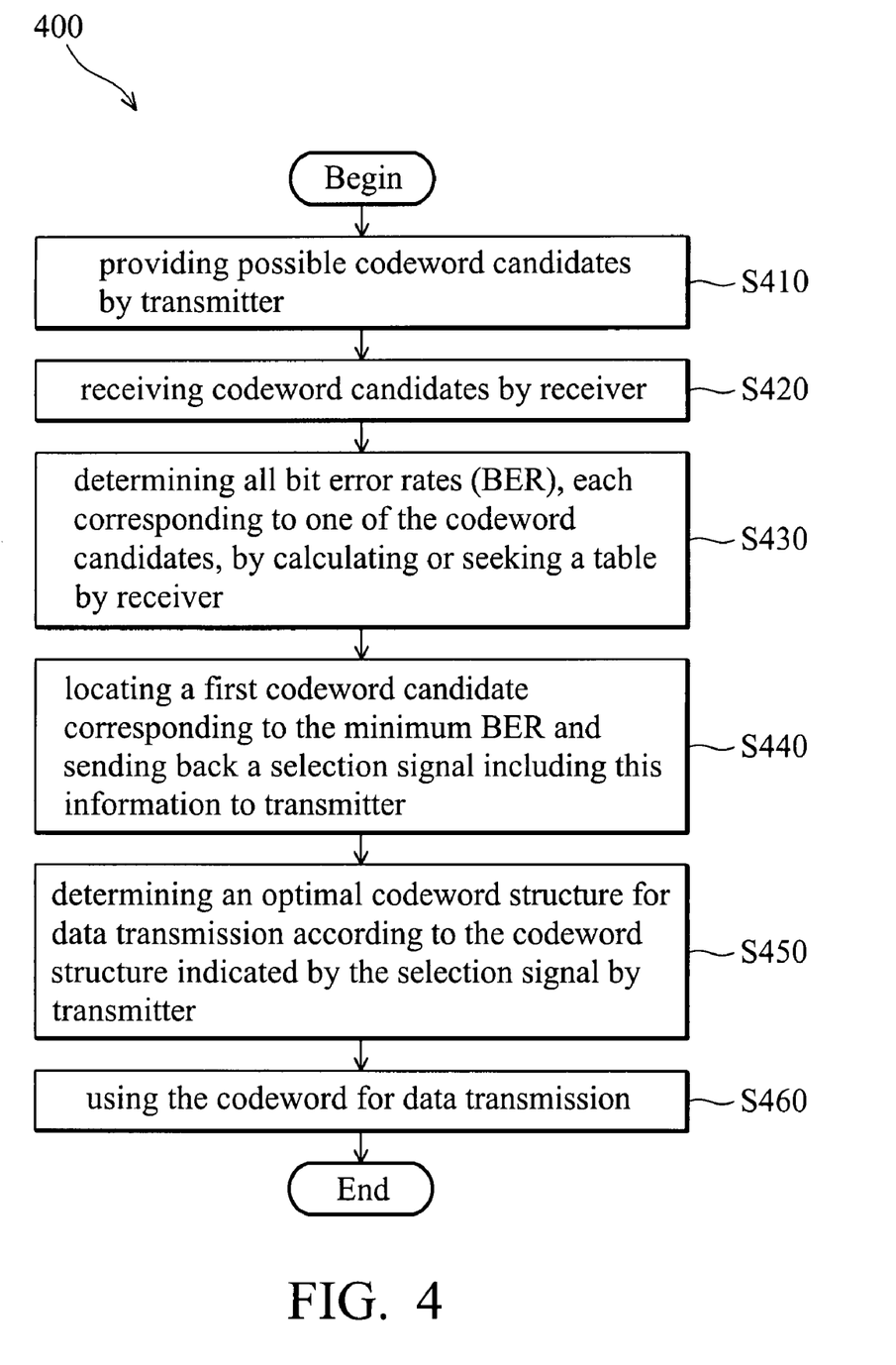
FIG. 4 is a flowchart of a codeword selection method according to an embodiment of the invention.

FIG. 4 is a flowchart of a codeword selection method according to an embodiment of the invention. A transmit antennas are partitioned into Q antenna groups to provide possible space-time codeword candidates according to the total number N of the transmit antennas by the transmitter 310 (step S410). In this embodiment, each antenna group can only employ two, three or four antennas to meet the orthogonal requirement due to the use of O-STBC coding. The codeword candidates may represent different antenna configuration to each other according to the total number N of the transmit antennas. For example, if the total number N of the transmit antennas is 10, one antenna configuration represented by a specific codeword candidate can be five groups, each of which represents two antennas of the N transmit antennas, and be represented by $\Sigma 1=(2,2,2,2,2)$. Similarly, another antenna configuration represented by another codeword candidate for the same N can be arranged as three, three and four antennas, and be represented by $\Sigma 2=(3,3,4)$. If there are antennas T1~T10, antennas T1 and T2 are grouped as an antenna group, and antennas T3 and T4 will also be grouped as an antenna group to transmit data according to codeword candidate of the antenna configuration $\Sigma 1$. Alternatively, antennas T1, T2 and T3 are grouped as an antenna group to transmit data at the same time according to a codeword candidate of the antenna configuration $\Sigma 2$. Also, Q antenna group types are sent to the receiver 320. The receiver 320 receives those codeword candidates (antenna group types) (step S420), and determines all the bit error rates, each corresponding to one of the space-time codeword candidates, by calculating or seeking a table (step S430). A detailed description of the steps for calculating or seeking a table is provided in the following. The receiver 320 locates a first codeword candidate corresponding to the minimum BER, and sends back a selection signal with the first codeword candidate to the transmitter 310 (step S440). Therefore, the transmitter 310 determines an optimal codeword structure for data transmission according to the codeword structure indicated by the selection signal (step S450). And, the transmitter 310 and the receiver 320 use the optimal codeword structure for performing data transmission (step S460).

Figure 5:
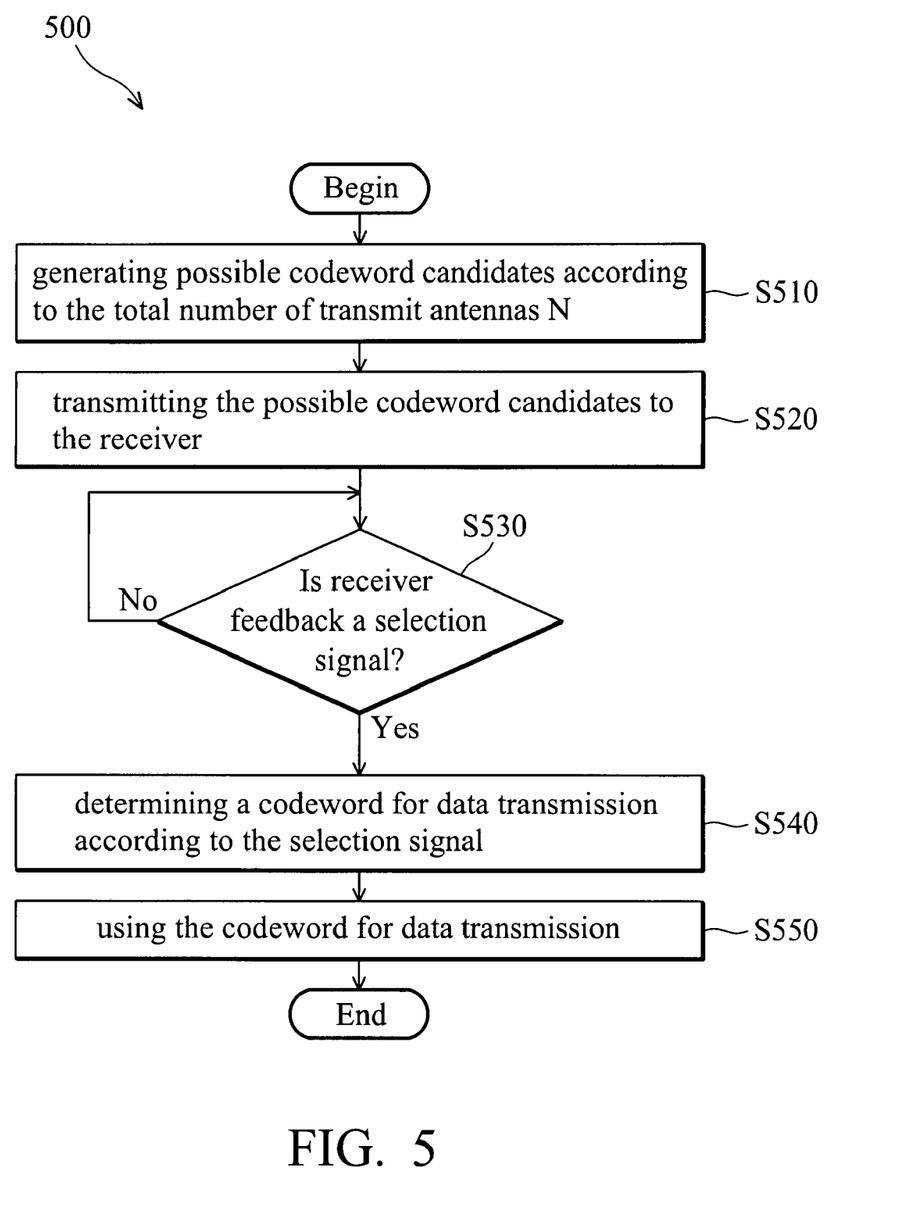
FIGS. 5 and 6 respectively show operating flowcharts at the transmitter side and the receiver side according to the codeword selection method showing in FIG. 4.
Figure 6:
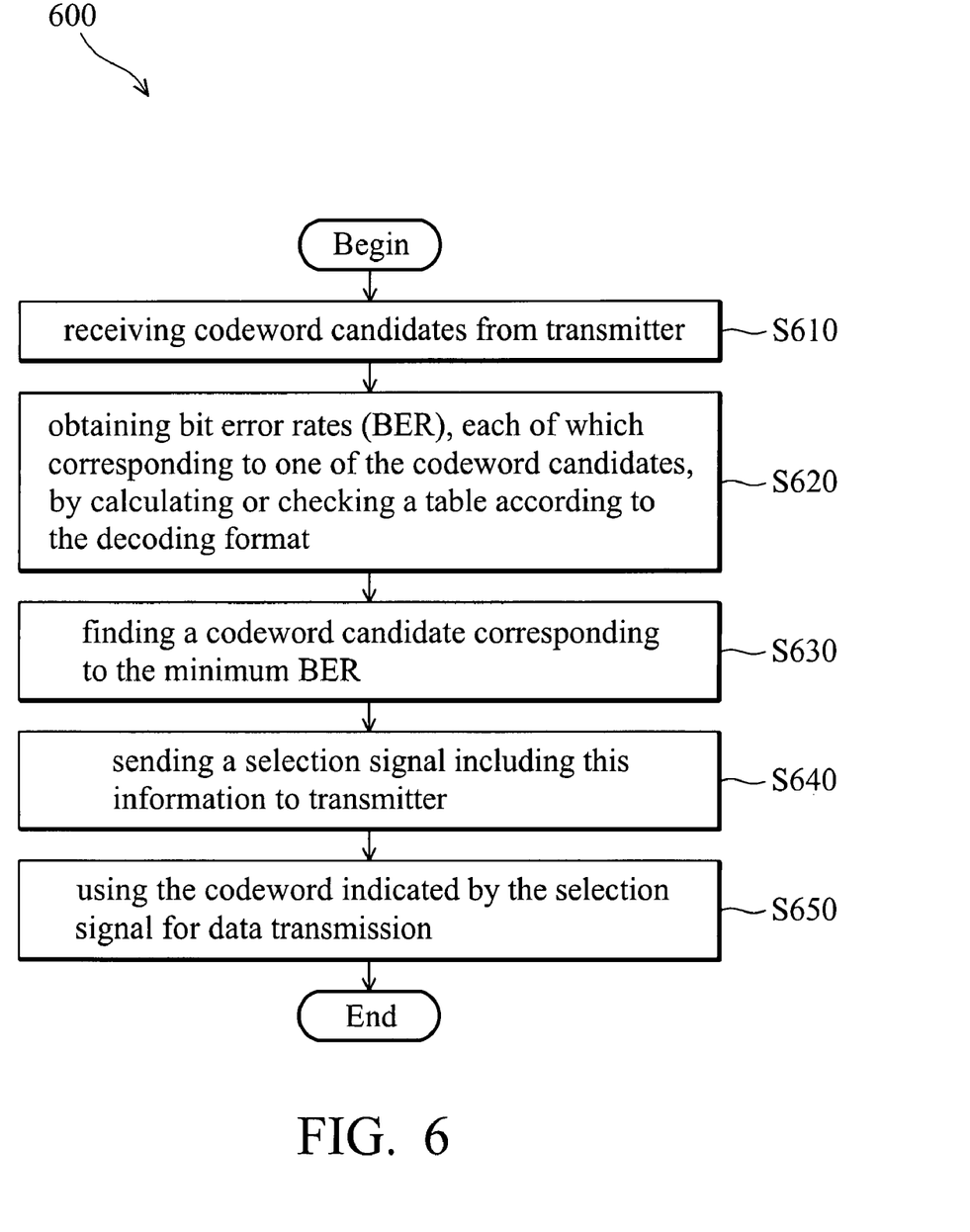

FIGS. 5 and 6 respectively show operating flowcharts of the transmitter side and the receiver side according to the codeword selection method showing in FIG. 4. As shown in FIG. 5, the transmit antennas are partitioned into Q antenna groups according to the total number N of the transmit antennas to generate possible codeword candidates by the transmitter 310 (step S510). Characteristics of space-time codeword including code rate, diversity gain and computational complexity of the receiver may be affected by the structure of the antenna groups (i.e. the codeword structure). For the total number N of the transmit antennas, even if the number of antennas in antenna groups AG1 and AG2 are the same, the structure of the antenna group AG1 may result in a different code rate than that of the other antenna group AG2. Moreover, a variety of diversity gains can be obtained by different antenna group structures, generating different communication link quality. Further, based on the group-wise OSIC detection rule, the computational complexity of the receiver may be changed if the structure of antenna group is different. Hence, all three characteristics of space-time codeword including code rate, diversity gain and computational complexity of the receiver must be considered when choosing an optimal space-time codeword. All possible space-time codeword candidates $\Sigma^N$ and code rates $R^N$ corresponding thereto for the total number N of the antennas from 2 to 16 are listed in Table 3. In Table 3, $J^N$ represents the number of possible codewords, $S^N$ represents the antenna configuration represented by each codeword, and $L^N$ represents the iterations required for performing an OSIC detection when the total number of the antennas is N. Thus, one total number N corresponds to one codeword structure.

Figure 8A:
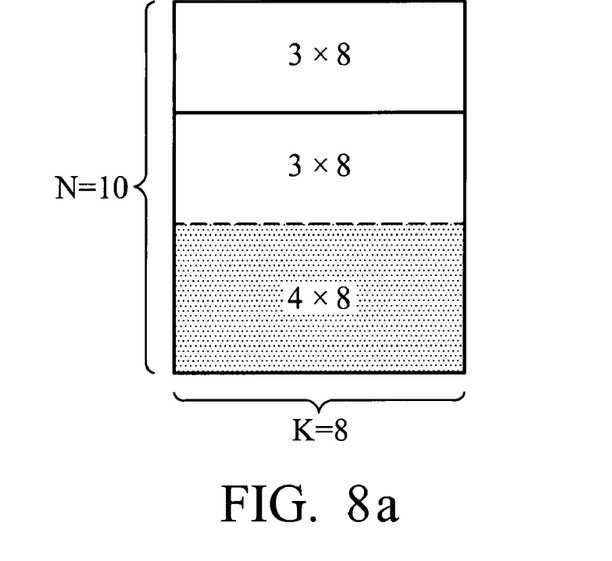
FIGS. 8a to 8e are schematic illustrations of five possible G-STBC codewords for the 10 transmit antennas in an embodiment of the invention.
Figure 8B:
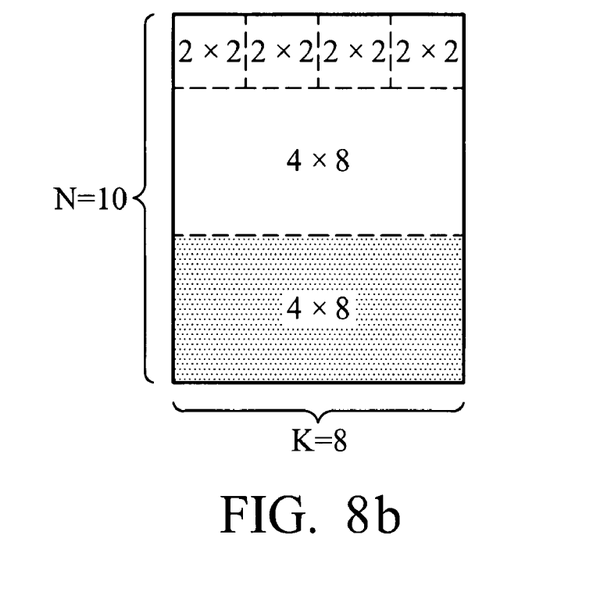
Figure 8C:
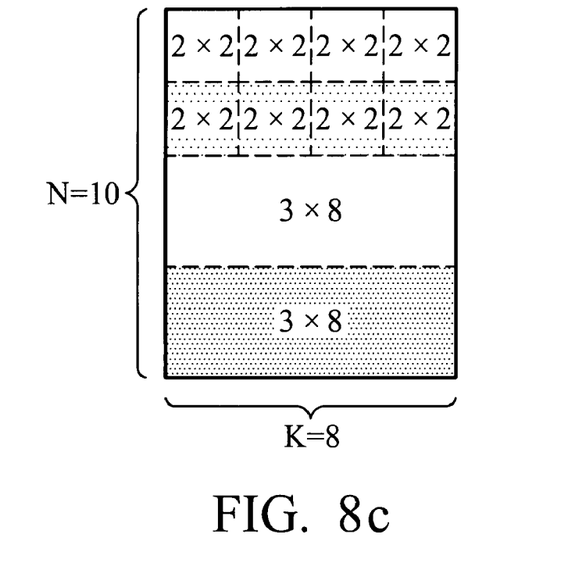
Figure 8D:
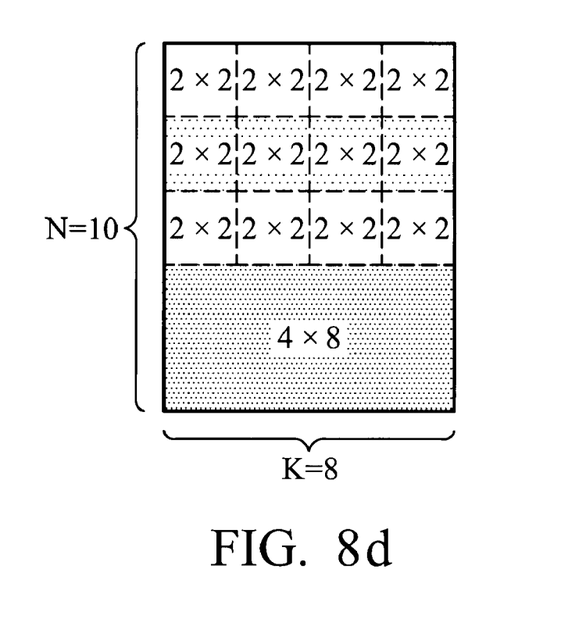
Figure 8E:
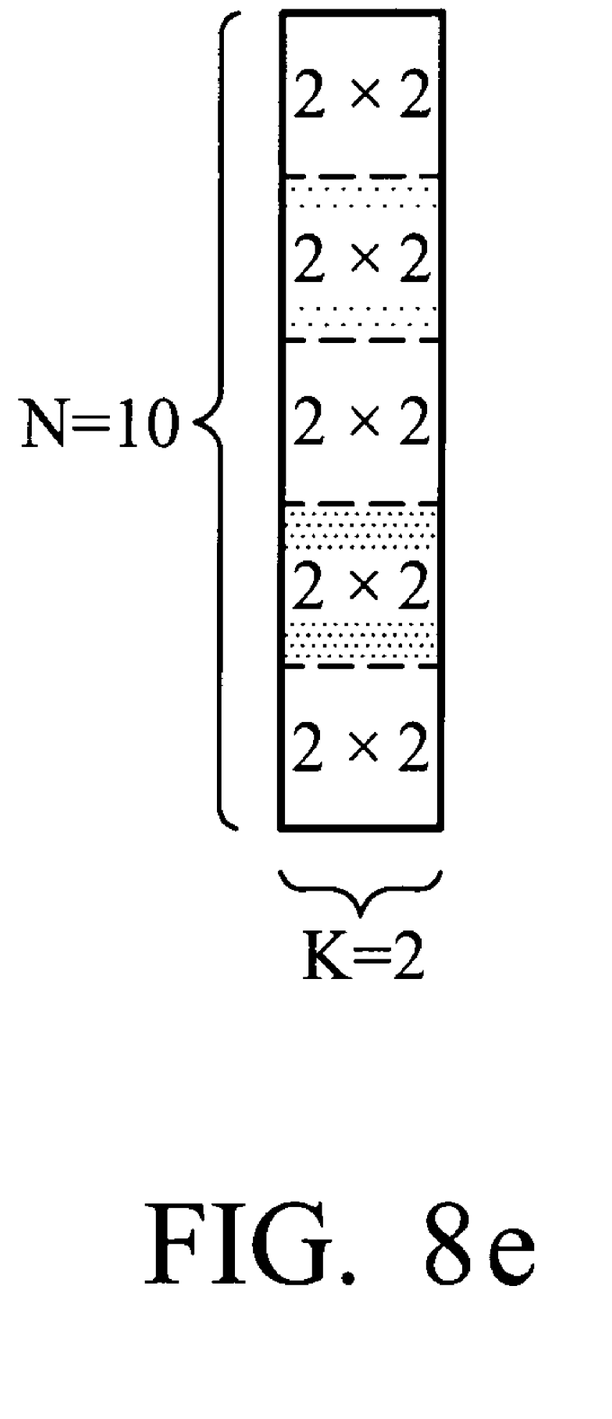

FIGS. 8a to 8e are schematic illustrations of five possible codewords (3,3,4), (2,4,4), (2,2,3,3), (2,2,2,4) and (2,2,2,2,2) respectively for the total number N of the transmit antennas is 10 in this embodiment of the invention. For example, in FIG. 8c, it represents the G-STBC codeword structure of codeword (i.e. antenna group structure) (2,2,3,3) for the total number N of the transmit antennas is 10 which is partitioned into four antenna groups (Q=4). In this example, a 2×2 STBC is used for an antenna group having two antennas and 3×8 STBC is used for an antenna group having three antennas, in which all STBCs used in each antenna group are orthogonal STBC (O-STBC). It is assumed that the symbol time length of the codeword structure shown in FIG. 8c is equal to N=8. It is known from FIGS. 8a to 8e that the codeword structure will be determined once the structure of an antenna group is determined when all the space-time codes corresponding to each group are orthogonal.

Next, possible space-time codeword candidates are transmitted to the receiver 320 (step S520). The receiver 320 is then expected to send back at least one feedback information. Thus, it is determined whether the receiver 320 sends back the feedback information (step S530). If not (No in step S530), the process returns to step S530 to determine whether the receiver 320 send back the feedback information. If so (Yes in step S530), the transmitter 310 determines to use a space-time codeword for data transmission according to the optimal codeword indicated by the feedback information. Finally, the data are encoded with the chosen optimal space-time codeword and then transmitted to the receiver for data transmission (step S550).

At the receiver side, as shown in FIG. 6, the receiver 320 receives space-time codeword candidates from transmitter 310 (step S610). A codeword candidate represents a specific antenna configuration. For example, if the total number N of transmit antennas is 10, there are five possible codeword candidates as shown in Table 3. Next, each bit error rate corresponding to a specific space-time codeword is determined by calculating or seeking a table according to decoding strategy (step S620). From Table 3, if N is 10, five BER values BER1~BER5 can be obtained after step S620 performed. For example, a BER value BER1 corresponds to codeword $\Sigma 1(2,2,2,2,2)$, a BER value BER2 corresponds to codeword $\Sigma 2(3,3,4)$ and so on. Then, a first codeword candidate corresponding to the minimum BER value among the BERs is found (step S630).

For a given spectrum efficiency $h(M_j^N)$, if a transmission bit rate $R_b$ (i.e. modulation type) is specified, the space-time codeword is also determined. Thus, under the constraints of total transmission power $P_T$ and transmission bit rate $R_b$, the jth optimal codeword is chosen based on the candidate at which the antenna configuration set $S_j^N$ can achieve the minimum BER performance as shown in the following equation:

$$j = \arg \min_{\forall j} P_e(S_j^N | \{P_T, R_b\}).$$

where $P_e$ represents overall BER of jth codeword and can be calculated as shown below:

$$P_e(j) = \frac{1}{\eta(M_j^N)} \sum_{q=1}^{Q} (R_q^N(j) R_{b,q}(j)) P_{e,q}(j) = \frac{1}{R^N(j)} \sum_{q=1}^{Q} R_q^N(j) P_{e,q}(j).$$

As the above equation shows, $P_{e,q}(j)$ is the BER of the qth antenna group under jth mode, in which the mode is referred to as a combination of specific space-time codeword and modulation. By ignoring error propagation effects in all iterations of OSIC detection, the BER of the qth antenna group $P_{e,q}(j)$ can be approximated as a function of the post-detected signal-to-interference-plus-noise ratio (SINR) $\gamma_q$ depending on the adopted detection criterion and the transmission bit rate $R_{b,q}$ as shown below $$P_{e,q} \approx g_{\gamma, Rb}(\gamma_q, R_{b,q}),$$

with $$\gamma_q(j) = \begin{cases} 1/\sigma_{v,q}^2(j), & \text{for ZF criterion} \\ (1-\varepsilon_q(j))/\varepsilon_q(j), & \text{for MMSE criterion} \end{cases}$$

wherein $$\sigma_{v,q}^2(j) = \frac{\sigma_v^2}{2} e_{q_i}^T [H_{c,q_i}^T(j) H_{c,q_i}(j)]^{-1} e_{q_i}$$

$$\varepsilon_q(j) = e_{q_i}^T \left[ \frac{2}{\sigma_v^2} H_{a,q_i}^T(j) H_{c,q_i}(j) + 1 \right]^{-1} e_{q_i}.$$

$\sigma_{v,q}^2$ and $\varepsilon_q$ are the output noise power and symbol MSE of the qth antenna group respectively with $H_{c,q_i}$ being defined as $H_{c,i}$ ($H_{c,i}$ is discussed later) and $e_l$ which is the lth unit standard vector of $R^{L_T}$. In this embodiment, when uncoded $\overline{M}$-ary QAM modulation is used for all transmitted symbols, the BER of the qth antenna group can be approximated as shown below:

$$g_{\gamma, Rb}(\gamma_q, R_b) \approx \frac{2}{R_{b,q}} \left(1 - \frac{1}{\sqrt{2^{R_{b,q}}}}\right) \text{erfc}\left(\sqrt{\frac{1.5 \gamma_q}{2^{R_{b,q}} - 1}}\right),$$

wherein $2^{R_{b,q}} = \overline{M}$ and erfc(.) is the complementary error function.

From above, it is known that the optimal codeword is chosen based on the codeword candidate at which the antenna group configuration set can achieve the minimum BER performance under the constraints of total transmission power $P_T$ and transmission bit rate $R_b$. If BER2 is minimal among all BERs, for example, the codeword candidate corresponding to BER2 is chosen as the optimal codeword. In this case, the codeword candidate Σ2 (3,3,4), is the optimal codeword. The receiver 320 then generates a selection signal including the optimal codeword is Σ2, and sends the selection signal to the transmitter 310 (step S640). Finally, the transmitter 310 receives the selection signal and encodes the data using the optimal codeword (Σ2) indicated by the selection signal for data transmission (step S650).

In summary, by using the communication systems and methods according to the embodiments, link quality for data transmission can be improved and the transmission bit rate can also be increased, providing a better balance between the link quality and the transmission bit rate. Furthermore, by using the O-STBC encoding at transmitter side, the computational complexity of the receiver can also be significantly reduced.

To fully explain the previously described determination method of the antenna group and related operations and effects thereon, some mathematical formulas and lemmas are introduced in the following with reference to the thesis "Space-time signal processing for MIMO wireless communications: Space-time signaling and interference suppression" (hereafter referred to as Reference 1) by the same inventor. It is understood that only part of the results in Reference1 are summarized and improved, detailed description is omitted here for brevity.

Consider a G-STBC system over the Rayleigh flat-fading channels as shown in FIG. 3, in which N antennas are placed at the transmitter and M antennas are located at the receiver. The N transmit antenna elements are partitioned into Q antenna groups as $(N_1, \ldots, N_Q)$ with each comprising 2, 3 or 4 antennas, so that $N_1 + \ldots + N_Q = N$. Particularly, for the qth group, consecutive $B_q$ symbols of the data stream are spatially and temporally encoded according to the O-STBC coding, and are then transmitted across $N_q$ antennas over $K_q$ symbol period.

Assume that the uni-rate codes for real-valued constellations with $2 \leq N_q \leq 4$ and complex-valued constellation with $N_q = 2$, and half-rate codes for complex-valued constellations with $3 \leq N_q \leq 4$ are applied to each antenna group. Let $K = \max\{K_1, \ldots, K_Q\}$, then, according to the property of the O-STBCs, K will be a multiple of $K_q$, that is, $K = k_q K_q$ with a positive integer $k_q = K/K_q$. During the K symbol periods, each antenna group then sends $L_q = k_q B_q$ independent symbols, and there are thus in total $$L_T := \sum_{q=1}^{Q} L_q = K \sum_{q=1}^{Q} \frac{B_q}{K_q}$$

data symbols transmitted from the Q antenna groups every K symbol periods. The code of each antenna group, called the group code, can also be completely described by the associated $N_q \times K_{ST}$ codeword matrix $X_q(k)$, q=1, ..., Q. It is assumed that the data stream of the qth antenna group $s_q(k)$ is partitioned into block of substreams as $s_{q,l}(k)$ as shown below:

$$s_{q,l}(k) = s_q(L_q k + l - 1), l = 1, \ldots, L_q,$$

where the number of substreams $L_q$ depends on the signaling mode chosen for the qth antenna group. Then the ST codeword matrix of the qth antenna group can be rewritten as $$X_q(k) := \sum_{l=1}^{2L_q} A_{q,l} \tilde{s}_{q,l}(k), \quad (1)$$

in which $A_{q,l}$ is the ST modulation matrix. It is assumed that $\tilde{s}_{q,l}(k) = \text{Re}\{s_{q,l}(k)\}$ for $l=1, \ldots, L_q$ and $\tilde{s}_{q,l}(k) = \text{Im}\{s_{q,l-L_q}(k)\}$ for $l = L_q + 1, \ldots, 2L_q$. Moreover, splitting the source symbols into the real and imaginary parts will also unify both the problem formulation and the underlying analysis, regardless of the number of group antennas $N_q$ and symbol constellations.

If M ($\geq$Q) antennas are used at the receiver, the signal collected at M antennas over K successive symbol period Y(k) can be obtained by the following equation:

$$Y(k) := [y(k), y(k+1), \ldots, \qquad (2)$$

$$y(k+K-1)] = \sum_{q=1}^{Q} \sqrt{\frac{P_q}{N}} H_q X_q(k) + V(k),$$

where $H_q = \sqrt{P_q} C_q$ is the channel matrix with $P_q$ being the total transmission power of the qth antenna group so that $P_1 + \ldots + P_Q = P_T$, in which $P_T$ is the total transmission power. In addition, $C_q$ is the $M \times N_q$ MIMO channel matrix from the qth antenna group to the receiver, and $V(k) \in C^{M \times K}$ is the channel noise matrix. The following assumptions are made in sequel.

(a1) The symbol streams $s_q(k)$'q=1, ..., Q are i.i.d. with zero-mean and unit-variance, and are considered the same modulation scheme.

(a2) Assume that equal power allocation for all antenna groups, i.e., $P_1 = \ldots = P_Q = P_T/Q$.

(a3) Each entry of the MIMO matrix channel $C_q$, q=1, ..., Q, is an i.i.d. complex Gaussian random variable with zero-mean and unit-variance, and assumed to be static during the K signaling periods.

(a4) The noise V(k) is spatially and temporally white with zero-mean and variance noise $\sigma_v^2$.

(a5) For $2 \leq N_q \leq 4$ with real-valued constellations or $N_q = 2$ with complex-valued constellations, according to O-STBCs, the unit rates O-STBC (i.e. code rate is 1) are used, while for $3 \leq N_q \leq 4$ with complex-valued constellations, the half rate (i.e. code rate is ½) O-STBCs are used.

Real-Valued Vectorized Data Model

To simplify the detection and analysis process, equation (2) can be rewritten, after some manipulations, as the following equivalent 2KM×1 real-valued vectorized linear model $$y_c(k) := [\tilde{y}^T(k), \tilde{y}^T(k+1), \ldots, \\ \tilde{y}^T(k+K-1)]^T = H_c s_c(k) + v_c(k) \qquad (3)$$

where $\tilde{y}(k) := [Re\{y^T(k)\} Im\{y^T(k)\}]^T \in R^{2M}$ $\tilde{s}(k) := [Re\{s_q^T(k)\} Im\{s_q^T(k)\}]^T \in R^{2L_q}$ $s_q(k) := [s_{q,1}(k), s_{q,2}(k), \ldots, s_{q,L_q}(k)]^T$, $H_c \in R^{2KM \times 2L_T}$ is the concatenated equivalent channel matrix, $s_c(k) := [\tilde{s}_1^T(k), \tilde{s}_2^T(k), \ldots \tilde{s}_Q^T(k)]^T \in R^{2L_T}$, is the transmitted symbol vector from Q antenna groups and $v_c(k) \in R^{2KM}$ is the corresponding noise component. Then, by linearly combining the received data $y_c(k)$ with $H_c$, the matched-filtered (MF) data vector can be obtained as shown below:

$$z(k) := H_c^T y_c(k) = F s_c(k) + v(k) \qquad (4)$$

where $F := H_c^T H_c \in R^{2L_T \times 2L_T}$ is the matched-filtered channel matrix (MFCM), and $v(k) := H_c^T v_c(k)$. The model (4) is hereafter used for detection.

OSIC Detection Under Real-Valued Symbols

To detect the transmitted symbols, the algorithm provided by the Reference1 is adopted. For real-valued constellation, by using the distinctive structures of the MFCM F shown in the following, one OSIC detector can per iteration jointly detect a block of K symbols associated with a particular antenna group, called the "antenna group-wise" detection property, in the considered G-STBC systems.

A. Matched-Filtered Channel Matrix (MFCM)

To effectively detect the transmission signals using OSIC detection, the structure of the MFCM F is analyzed. It is to be understood that only the important results are introduced here. The detail can be referred to Reference1.

Let O(K) represents a set of all K×K real orthogonal designs with K independent inputs, and O(K,L) represents the set of all K×K real orthogonal designs with L independent inputs.

Result II.1: Consider the real-valued constellations with $2 \leq N_p, N_q \leq 4$. According to O-STBCs, it can be known that K $\in \{2, 4\}$. Let $F_{p,q}$ be the (p,q)th $L_q \times L_q$ block submatrix of F, where F is defined in (4). Then, it is known that $F_{q,q} = \alpha_q I_K$ and $F_{p,q} \in O(K)$ whenever $p \neq q$.

Figure 7:
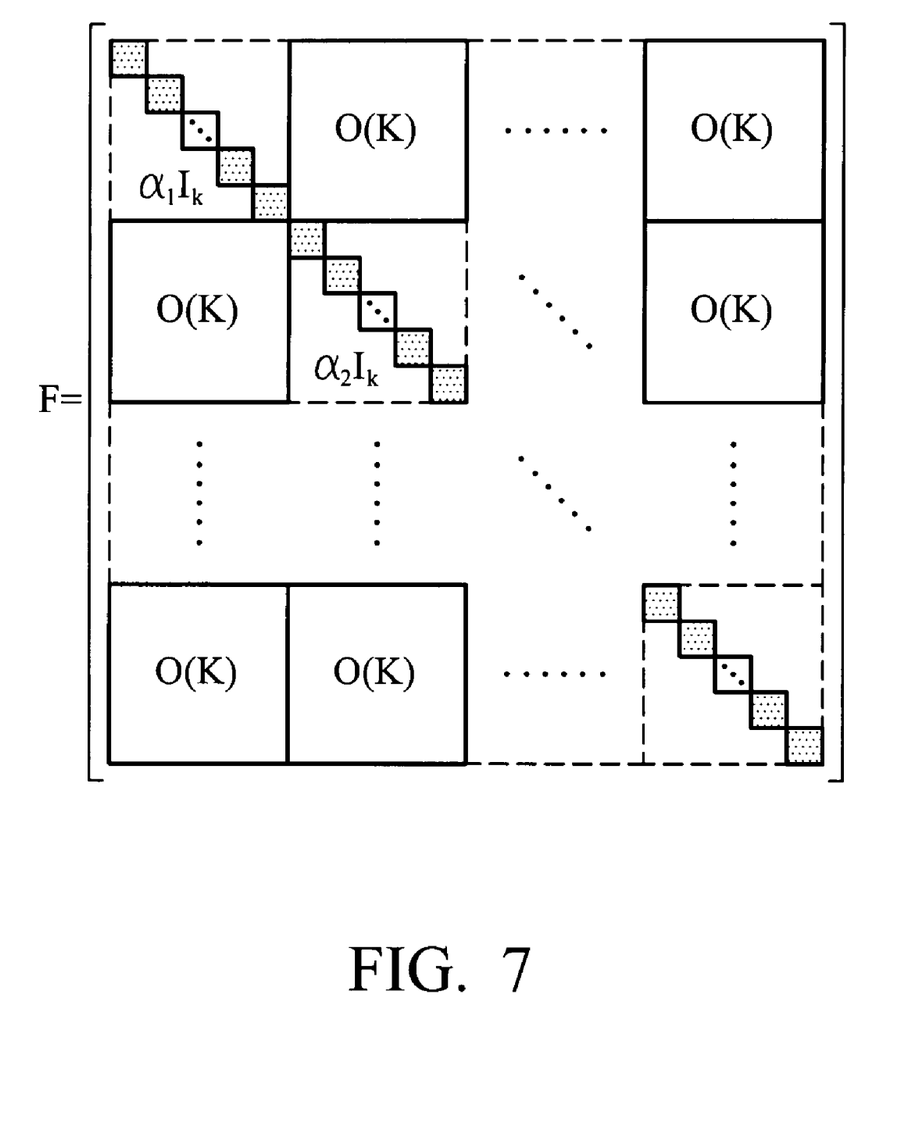
FIG. 7 is a schematic illustration of an embodiment of a matched-filter channel matrix (MFCM) structure according to the invention.

The result of Result II.1 are summarized in Table1, where $F_{p,q}^{(s,t)}$ is the (s,t)th block matrix of $F_{q,q}$ with a proper dimension. The structures of F are shown in FIG. 7. Result II.1, as summarized in Table1, shows that the block orthogonal structures of F can thus substantially be preserved. From this result, as we will see in what follows, the "antenna group-wise" OSIC detection can be done in this invention.

B. Group-Wise OSIC Detection Scheme

In the following result, it is observed that the structure of $F^{-1}$, loosely stated, inherits the key features of F established in Result II.1. Let $F_{KL}(L)$ is defined to be the set of all invertible real symmetric KL×KL matrices, where K and L are two integers, so that, for $X \in F_{KL}(L)$, with $X_{k,l}$ being the (k,l)th K×K block matrix. Thus, $X_{l,l} = \beta_l I_k$ and $X_{k,l} \in O(K)$ if $k \neq l$.

Fact II.1: If $F \in F_{KL}(L)$, so is $F^{-1}$ (referring to Reference1).

Based on Fact II.1, the Result II.2 can be obtained as shown below:

Result II.2: Consider the real-valued constellations with $2 \leq N_p, N_q \leq 4$, and hence K $\in \{2, 4\}$. Let F $\in R^{L_T \times L_T}$ be the MFCM as defined in (4). Then each K×K block diagonal submatrix of $F^{-1}$ is a scalar multiple of $I_K$ and each K×K block off-diagonal submatrix of $F^{-1}$ belongs to O(K).

Result II.2 shows that the total KL diagonal entries of $F^{-1}$ assume L=Q distinct levels $\underline{\beta}_l$, l=1, ..., L, that is $$diag(F^{-1}) = \{\underbrace{\underline{\beta}_1, \ldots, \underline{\beta}_1}_{K \text{ entries}}, \underbrace{\underline{\beta}_2, \ldots, \underline{\beta}_2}_{K \text{ entries}}, \ldots, \underbrace{\underline{\beta}_L, \ldots, \underline{\beta}_L}_{K \text{ entries}}\}, \qquad (5)$$

wherein the number of each level $\underline{\beta}_l$ is K and diag(.) denotes the diagonal operation. From the equation (5), based on the zero-forcing (ZF) OSIC detection, it is observed that it suffices to search among the L values, one associated with a particular "antenna group" (or say the layer in the standard V-BLAST detection), for the optimal detection order. Therefore, the OSIC detector can simultaneously detect a bock of K symbols at the initial stage. To compute the optimal indexes and corresponding weights (either for ZF or for minimum mean square error (MMSE) criterion) required in OSIC based detection, the explicit knowledge of diagonal entries of $F_i^{-1}$ is needed, where $$F_i = H_{c,i}^T H_{c,i} \qquad (6)$$

is the "deflated" MFCM at ith OSIC iteration, and $H_{c,i}$ being obtained by deflating i blocks of K columns (corresponding to the previously detected signals) from $H_c$. With such a detect-and-cancel procedure associated with the OSIC detector followed by an associated linear combing of the resultant data (4), it can be directly verified that, at the ith iteration of OSIC, i=1, ..., L-1, the noise covariance matrix for ZF OSIC is of the form $F_i^{-1}$. Thus, $F_i \in F_{KL}(L-i)$.

Result II.3: Using Fact II.1, it can be immediately shown that $F_i^{-1} \in F_{KL}(L-i)$, which implies that $$diag(F_i^{-1}) = \{\underbrace{\beta_{i,1}, \ldots, \beta_{i,1}}_{K \text{ entries}}, \underbrace{\beta_{i,2}, \ldots, \beta_{i,2}}_{K \text{ entries}}, \ldots, \underbrace{\beta_{i,L-i}, \ldots, \beta_{i,L-i}}_{K \text{ entries}}\}, \quad (7)$$

where $\beta_{i,l}$ is the lth distinct value distributed on the diagonal of $F_i^{-1}$, and the number of $\beta_l$ is K. As a result, a block of K symbols transmitted from a particular antenna group can be jointly detected at each iteration building to an antenna group-wise OSIC detection property.

By following the previous analysis, antenna group-wise OSIC detection can thus be done at each processing step.

OSIC Detection for Complex-Valued Constellations

It is shown above that, when the real symbol constellations are used, the OSIC detection algorithm can be implemented in an "antenna group-wise" manner. For complex-valued constellations, however, the antenna can not be performed group-wise OSIC detection directly. For complex-valued constellations, it will be shown below that only a half of a block of $2L_q$ real-valued symbols, (i.e., a block of $L_q$ real-valued symbols) either from the real part or imaginary part of the complex-valued symbols associated with an antenna group may per iteration be jointly detected in OSIC based processing.

A. Matched-Filtered Channel Matrix (MFCM)

For complex-valued constellations, by regarding the real part and imaginary part of a complex symbol as two independent real-valued symbols, there are some relevant results essentially different to those in Result II.1.

Result III.1: Consider the complex-valued constellations with $2 \leq N_p$ and $N_q \leq 4$. Based on O-STBCs, it is obtained that $K \in \{2, 8\}$. Let $F_{p,q}$ be the (p,q)th $2L_q \times 2L_q$ block matrix of F, where F is defined in (4). The results of Result III.1 are summarized in Table2. This special structure will no longer allow the "antenna group-wise" OSIC detection framework as described in the real-valued constellations case.

B. Group-Wise OSIC Detection Scheme

According to Result III.1, it is observed that the structure of $F_i^{-1}$, loosely stated, is no longer inherits the essential features of F. Before investigating the feature of $F_i^{-1}$, following definitions are needed. A decision group $\Gamma_{ig,g} = 1, \ldots, G_i$, where $G_i$ is the total number of decision groups at the ith iteration, is defined as a group with half of real-valued symbols over one antenna group in the ith detection iteration. Each antenna group thus includes two decision groups, each of which has $L_q$ real-valued symbols. Let $I_{i,1}$ and $I_{i,1/2}$ be respectively the index sets of decision group for unit-rate codes and half-rate codes, with $G_{i,1} = |I_{i,1}|$ and $G_{i,2} = |I_{i,2}|$ denoting the respective cardinalities. Also, let $I_i := I_{i,1} \cup I_{i,1/2}$ be the index set of total decision groups, with $G_i = |I_i|$ denoting the corresponding cardinality. The result is hold as shown below:

$$I_i = \begin{cases} I_{i,1} & \text{if } I_i \cap I_{i,1/2} = \emptyset, \\ I_{i,1/2} & \text{if } I_i \cap I_{i,1} = \emptyset. \end{cases} \quad (8)$$

Conversely, let the diagonal entries of $F_i$ are partitioned into $G_i$ decision groups, with each of which having the same (nonzero) value, namely $$diag(F_i) = \{\alpha_{i,1}, \ldots, \alpha_{i,1}, \alpha_{i,2}, \ldots, \alpha_{i,2}, \ldots, \alpha_{i,G}, \ldots, \alpha_{i,G_i}\} := \quad (9)$$

$$\{\mathcal{G}_{i,1}, \mathcal{G}_{i,2}, \ldots, \mathcal{G}_{i,G_i}\}$$

Assume that $\{a_{i,g}\}_{g=1}^{G_i}$ exhibit $D_i(G_i)$ different levels with $\lceil G_i/2 \rceil \leq D_i(G_i) \leq G_i$, where $D_i$ is a function of $G_i$.

Next, define $\tilde{F}_J(G, D)$ to be the set of all invertible real symmetric J×J matrices, where J, G, D are the positive integers, so that, for $X \in \tilde{F}_J(G, D)$, the following results hold: (1) each block diagonal submatrix of X is a (nonzero) scaled identity matrix $\alpha_g I_{Mg}$, $g=1, \ldots, G$, with $Mg \in \{2, 4, 8\}$, (2) $\{\alpha_g\}_{g=1}^{G}$ exhibit D different values, with $\lceil G/2 \rceil \leq D \leq G$, (3) for i, j=1, ..., G, i≠j, each 4×4 block submatrix of $M_i \times M_j$ block off-diagonal submatrix of X belongs to O(4) or is a zero matrix. Moreover, if D=G, $\tilde{F}_J(G, D=G)$ will be simplified as $\tilde{F}_J(G)$.

Result III.2: Consider the complex-valued constellation. Assume that unit-rate and half-rate codes are exist simultaneously at the ith detection stage, i.e., $I_i \cap I_{i,1} \neq \emptyset$ and $I_i \cap I_{i,1/2} \neq \emptyset$. Let $I_i(g)$, $g=1, \ldots, G_i$ be the gth element of $I_i$ and $F_1 \in R^{j_i \times j_i}$ is the MFCM at OSIC ith iteration, where $$J_i := \sum_{j \in I_i} L_{\lceil j/2 \rceil} = \sum_{g=1}^{G_i} L_{\lceil I_i(g)/2 \rceil} \quad (10)$$

with $L_q \in \{2,4,8\}$ for all q.

Thus, if $F_i \in \tilde{F}_{J_i}(G_i, D_i)$, $F_i^{-1} \in \tilde{F}_{J_i}(G_i)$. It is known from Result III.2 that $J_i$ diagonal entries of $F_i^{-1}$ will assume $G_i$ ($\geq D_i$) distinct levels $\{\beta_{i,g}\}_{g=1}^{G_i}$ (where $F_i$ only has $D_i$ distinct levels), that is $$diag(F_i^{-1}) = \{\beta_{i,1}, \ldots, \beta_{i,1}, \beta_{i,2}, \ldots, \beta_{i,2}, \ldots, \quad (11)$$

$$\underline{\beta_{i,G}, \ldots, \beta_{i,G_i}}\} := \{\mathcal{G}_{i,1}, \mathcal{G}_{i,2}, \ldots, \mathcal{G}_{i,G_i}\}.$$

From (11), it is observed that it suffices to search among the $G_i$ values, one associated with a particular block of $L_q$ real-valued symbols, that is, a half of real-valued symbols from the qth antenna group, for the optimal detection order. The $L_q$ real-valued symbols belong to either the real part or the imaginary part of the complex-valued symbol associated with one antenna group. As a result, to completely detect the $2L_q$ real-valued symbols associated with a particular antenna group, such a detection manner might double the computational load than that of the antenna group-wise detection property, so that the overall detection complexity will be increased. To reduce the receiver complexity for the given system, some solutions are proposed below.

Implementation Issues of Group-Wise OSIC Detection for Complex-Valued Constellations Some implementation issues of the group-wise OSIC detection for complex-valued constellations including the antenna group-wise detection strategy, two-stage detection strategy and a computationally efficient recursive based realization are presented here to further reduce the receiver complexity. As previously described, Reference1 shows that the implementation of antenna group-wise detection can be done for the real-valued constellation. Thus, only the implementations of antenna group-wise detection for the complex-valued constellations are discussed here.

A. Antenna Group-Wise Detection Strategy

It is noticed from Result III.2 that the $2L_{q_i}$ entries distributed on the diagonal of $F_i^{-1}$ within an antenna group will response to two levels as $\beta_{L_{qi},1}$ and $\beta_{L_{qi},2}$. To carry out the antenna group-wise detection, an intuitive approach is to "directly search" the corresponding group index of the diagonal entries of $F_i^{-1}$ at which level of antenna group is minimal. This is the simplest method, but however, it may also induce a large detection error. To solve this problem, another approach that averages the two level value $\beta_{qi,1}$ and $\beta_{q2,1}$ within an antenna group is proposed as shown below:

$$\beta_{i,q} = \frac{\beta_{q_i,1} + \beta_{q_i,2}}{2}, \qquad (12)$$

and rewrite the $$\sum_{q=1}^{Q-i} 2L_{q_i}$$

diagonal entries of $F_i^{-1}$ as $$\text{diag}(F_i^{-1}) = \left[\beta_{i,1}, \ldots, \beta_{i,1}, \beta_{i,2}, \ldots, \beta_{i,2}, \ldots, \beta_{i,Q-i}, \ldots, \beta_{i,Q-i}\right]^T.$$

Based on $\beta_{i,1}, \beta_{i,2}, \ldots, \beta_{i,Q-i}$, the corresponding indices at which antenna group is minimal are searched. Since the detection order under these ways may violate the actual optimal sorting, such a simple processing strategy can reduce computation at the expense of a possible performance drop. It can be observed from the simulation results that, however, the performance drop is not critical.

B. Two-Stage Detection Strategy

Theoretically, the antenna group that has the higher diversity advantage (i.e., large $N_q$ or lower rate) is robust against the channel impairments and can thus be detected first, the performance and ability to prevent channel fading is stronger than other antenna groups. Based on this point of view, in this invention, a detection strategy based on the two-stage detection is disclosed. The antenna groups are categorized into two classes based on their code rates: one class for high-rate (unit-rate) code ($N_q=2$) and another for low-rate (half-rate) code ($N_q=4$ or $N_q=3$). Then, detection of the symbols in a class-by-class manner, that is, the low-rate antenna groups ($N_q=4$ or $N_q=3$) are detected first through the group-wise OSIC detection algorithm and then for high-rate antenna groups ($N_q=2$), to further reduce the detection computational complexity. Likewise, due to the non-optimal detection ordering, such a detection strategy may also cause a performance loss, but it is observed from the simulation results that the performance loss is slight and within an acceptable regain. Note that in the first processing stage, since the different code rates still exist, the proposed "average" or "direct" method can be used.

C. Recursive Based Implementation

To further alleviate the detection complexity, in this invention, the recursive strategy as disclosed by Reference1 is modified and improved for implementing the group-wise OSIC detector.

From the Result III.2, it is shown that the minimum size of an orthogonal matrix in $F_{p_i,q_i}^{-1}$ is $4\times 4$, where $F_{p_i,q_j}^{-1}$ is the (p,q)th block matrix of $F_i^{-1}$. Since the recursive based implementation can only tackle a block orthogonal matrix once at a time, as the matrix of $F_i$ is large, directly implement the recursive based processing for the original group-wise OSIC detection described above shall need more iterations and thus large computational complexity. Fortunately, the two-stage detection strategy, which detects the low rate codes first and then for high rate codes, can help to reduce the required number of iterations. As a result, the recursive based implementation incorporating the two-stage detection strategy will be discussed below. It is assumed that there are two levels on the diagonal entries of $F_i^{-1}$ within an antenna group at each iteration, and $F_i$ is the MFCM at the ith iteration. Then $F_{i-1}$ can be partitioned as $$F_{i-1} = \left[\begin{array}{c|c} F_i & B_{i-1} \\ \hline B_{i-1}^T & D_{i-1} \end{array}\right], \qquad (13)$$

where $$B_{i-1} \in R^{2(L_T-\sum_{j=1}^{i-1})\times 2L_{qi-1}},$$

and $D_{j-1}=d_{i-1}I_{2L_{qi-1}}$ for some scalar $d_{i-1}$. Further, if the $\overline{F}_{i-1}$ denotes the $$2\left(L_T - \sum_{j=1}^{i-1} L_{q_j}\right) \times 2\left(L_T - \sum_{j=1}^{i-1} L_{q_j}\right)$$

principle submatrix of $F_{i-1}^{-1}$ with $F_0^{-1}=F^{-1}$. From equation (13) and applying the inversion lemma for block matrix, $\overline{F}_{i-1}$ can be represented as $$\overline{F}_{i-1}=(F_i-B_{i-1}D_{j-1}^{-1}B_{j-1}^T)^{-1} \qquad (14)$$

In particular, it follows from equation (14) that $$F_i=\overline{F}_{i-1}^{-1}+B_{i-1}D_{i-1}^{-1}B_{i-1}^T \qquad (15)$$

and then using the matrix inversion lemma, $F_i^{-1}$ can be obtained as shown below:

$$F_i^{-1}=\overline{F}_{i-1}-E_{i-1}C_{i-1}^{-1}E_{i-1}^T \qquad (16),$$

where $E_{i-1}:=\overline{F}_{i-1}B_{i-1}$, and $$C_{i-1} = B_{i-1}^T \overline{F}_{i-1} B_{i-1} + D_{i-1} = \left[\begin{array}{cc} c_{1,i-1}I_{L_{qi-1}} & 0_{L_{qi-1}} \\ 0_{L_{qi-1}} & c_{2,i-1}I_{L_{qi-1}} \end{array}\right],$$

for some scalars $c_{j,i-1}$, $j=1, 2$.

The simplification in equation (16) implies that $F_i^{-1}$ in each iteration can be recursively computed based on $F_{i-1}$ and $F_{i-1}^{-1}$, providing a simple recursive formula for computing $F_i^{-1}$ based on $F_{i-1}$ and $F_{i-1}^{-1}$ without any direct matrix inversion operations. Therefore, according to recursive detection of the invention, the detection computational load is effectively reduced.

While the invention has been described by way of example and in terms of preferred embodiment, it is to be understood that the invention is not limited thereto. To the contrary, it is intended to cover various modifications and similar arrangements (as would be apparent to the skilled in the art). Therefore, the scope of the appended claims should be accorded the broadest interpretation so as to encompass all such modifications and similar arrangements.

TABLE 1

| | | |
|---|---|---|
| K = 2 | $N_p = N_q = 2$ | p = q: $F_{q,q} = \alpha_q I_2$ |
| | | p ≠ q: $F_{p,q} \in O(2)$ |
| K = 4 | $N_p = N_q = 2$ | p = q: $F_{q,q} = \alpha_q I_4$ |
| | | p ≠ q: $F_{p,q} \in R^{4\times 4}$ |
| | | $F_{p,q}^{(1,1)} = F_{p,q}^{(2,2)} \in O(2);$ |
| | | $F_{p,q}^{(1,2)} = F_{p,q}^{(2,1)} = O_2$ |
| | $2 \leq N_p, N_q \leq 4$ | p = q: $F_{q,q} = \alpha_q I_4$ |
| | $N_p \neq N_q \neq 2$ | p ≠ q: $F_{p,q} \in O(4)$ |

TABLE 2

| | | |
|---|---|---|
| K = 2 | $N_p = N_q = 2$ | p = q: $F_{q,q} = \alpha_q I_4$ |
| | | p ≠ q: $F_{p,q} \in O(4)$ |
| K = 8 | $N_p = N_q = 2$ | p = q: $F_{q,q} = \alpha_q I_{16}$ |
| | | p ≠ q: $F_{q,p} \in R^{16\times 16}$ |
| | | $F_{p,q}^{(s,t)} \in O(8, 2), 1 \leq s, t \leq 2$ |
| | | $F_{p,q}^{(1,1)} = F_{p,q}^{(2,2)}; F_{p,q}^{(1,2)} = -F_{p,q}^{(2,1)}$ |
| | $N_p = 2$ | p = q: $F_{q,q} = \alpha_q I_{2L_q}$ |
| | $3 \leq N_q \leq 4$ | p ≠ q: $F_{p,q} \in R^{16\times 8}$ |
| | | $F_{p,q}^{(s,t)} \in O(4), 1 \leq s \leq 4, 1 \leq t \leq 2$ |
| | | $F_{p,q}^{(1,1)} = F_{p,q}^{(2,1)}; F_{p,q}^{(3,1)} = F_{p,q}^{(4,1)};$ |
| | | $F_{p,q}^{(1,2)} = -F_{p,q}^{(2,2)}; F_{p,q}^{(3,2)} = -F_{p,q}^{(4,2)}$ |
| | $3 \leq N_p, N_q \leq 4$ | p = q: $F_{q,q} = \alpha_q I_4$ |
| | | p ≠ q: $F_{q,p} \in R^{8\times 8}$ |
| | | $F_{p,q}^{(1,1)} = F_{p,q}^{(2,2)} \in O(4);$ |
| | | $F_{p,q}^{(1,2)} = F_{p,q}^{(2,1)} = O_4$ |

TABLE 3

| N | $J^N$ | Possible sets of antenna configuration, $S^N$ | Coding rate | Max number of iterations |
|---|---|---|---|---|
| 2 | 1 | (2) | 1 | 1 |
| 3 | 1 | (3) | 0.5 | 1 |
| 4 | 2 | (4), (2,2) | 0.5, 2 | 1, 2 |
| 5 | 1 | (2,3) | 1.5 | 4 |
| 6 | 3 | (3,3), (2,4), (2,2,2) | 1, 1.5, 3 | 2, 4, 3 |
| 7 | 2 | (3,4), (2,2,3) | 1, 2.5 | 2, 6 |
| 8 | 4 | (4,4), (2,3,3), (2,2,4), (2,2,2,2) | 1, 2, 2.5, 4 | 2, 6, 6, 4 |
| 9 | 3 | (3,3,3), (2,3,4), (2,2,2,3) | 1.5, 2, 3.5 | 6, 3, 8 |
| 10 | 5 | (3,3,4), (2,4,4), (2,2,3,3), (2,2,2,4), (2,2,2,2,2) | 1.5, 2, 3, 3.5, 5 | 3, 6, 8, 8, 5 |
| 11 | 4 | (3,4,4), (2,3,3,3), (2,2,3,4), (2,2,2,2,4) | 1.5, 2.5, 3, 4.5 | 3, 8, 8, 10 |
| 12 | 7 | (4,4,4), (3,3,3), (2,3,3,4), (2,2,4,4), (2,2,2,3,3), (2,2,2,2,4), (2,2,2,2,2,2) | 1.5, 2, 2.5, 3, 4, 4.5, 6 | 3, 4, 8, 8, 10, 10, 6 |
| 13 | 5 | (3,3,3,4), (2,3,4,4), (2,2,3,3,3), (2,2,2,3,4), (2,2,2,2,2,3) | 2, 2.5, 3.5, 4, 5.5 | 4, 8, 10, 10, 12 |
| 14 | 8 | (3,3,3,4), (2,4,4,4), (2,3,3,3,3), (2,2,3,3,4), (2,2,2,4,4), (2,2,2,2,3,3), (2,2,2,2,2,4), (2,2,2,2,2,2,2) | 2, 2.5, 3, 3.5, 4, 5, 5.5, 7 | 4, 8, 10, 10, 10, 12, 12, 7 |
| 15 | 7 | (3,4,4,4), (3,3,3,3,3), (2,3,3,3,4), (2,2,3,4,4), (2,2,2,3,3,3), (2,2,2,2,3,4), (2,2,2,2,2,2,3) | 2, 2.5, 3, 3.5, 4.5, 5, 6.5 | 4, 5, 10, 10, 12, 12, 14 |
| 16 | 10 | (4,4,4,4), (3,3,3,3,4), (2,3,3,4,4), (2,2,4,4,4), (2,2,3,3,3,3), (2,2,2,3,3,4), (2,2,2,2,4,4), (2,2,2,2,2,3,3), (2,2,2,2,2,2,4), (2,2,2,2,2,2,2,2) | 2, 2.5, 3, 3.5, 4, 4.5, 5, 6, 6.5, 8 | 4, 5, 10, 10, 12, 12, 12, 14, 14, 8 |

What is claimed is:

1. A method for codeword selection in a multi-input multi-output (MIMO) communication system, the system having multiple transmit antennas and multiple receive antennas, the method comprising:

providing codeword candidates by a transmitter;

receiving the multiple codeword candidates by a receiver to determine bit error rates, each corresponding to one of the codeword candidates according to a decoding strategy;

finding a codeword candidate with the minimum bit error rate and sending a selection signal to the transmitter; and determining a codeword for data transmission according to the selection signal, wherein each of the codeword candidates employs Nq antennas, with Nq being equal to 2, 3 or 4 and the antenna numbers of the codeword candidates are different from each other.

2. The method as claimed in claim 1, further comprising the following steps performed at the transmitter:

generating the codeword candidates according to the number of the transmit antennas;

receiving the selection signal from the receiver; and determining the codeword according to the selection signal and applying the codeword for data transmission.

3. The method as claimed in claim 1, further comprising the following steps performed at the receiver:

receiving the codeword candidates from the transmitter;

calculating the bit error rates, each corresponding to one of the multiple codeword candidates; and sending the selection signal to the transmitter to determine the codeword for data transmission at the transmitter side, wherein the selection signal has information with respect to the codeword candidate with the minimum bit error rate.

4. The method as claimed in claim 1, wherein the codeword selection is associated with a space-time (ST) codeword selection.

5. The method as claimed in claim 1, wherein each of the codeword candidates represents an orthogonal space-time block code (O-STBC).

6. The method as claimed in claim 1, wherein the decoding strategy utilizes an ordered successive interference cancellation (OSIC) detection strategy.

7. The method as claimed in claim 1, wherein the decoding strategy utilizes a two-stage detection strategy.

8. A method for codeword selection in a multi-input multi-output (MIMO) communication system, the system having multiple transmit antennas and multiple receive antennas, the method comprising:

providing codeword candidates by a transmitter;
receiving the multiple codeword candidates by a receiver to determine bit error rates, each corresponding to one of the codeword candidates according to a decoding strategy;
finding a codeword candidate with the minimum bit error rate and sending a selection signal to the transmitter; and
determining a codeword for data transmission according to the selection signal,
wherein the decoding strategy utilizes a two-stage detection strategy, and wherein the two-stage detection strategy comprises:
detecting the codeword candidates with three or four antennas first; and then
detecting the codeword candidates with two antennas.

9. The method as claimed in claim 8, wherein the two-stage detection strategy is performed with a recursive based implementation.

10. A method for codeword selection in a multi-input multi-output (MIMO) communication system, the system having multiple transmit antennas and multiple receive antennas, the method comprising:
providing codeword candidates by a transmitter;
receiving the multiple codeword candidates by a receiver to determine bit error rates, each corresponding to one of the codeword candidates according to a decoding strategy;
finding a codeword candidate with the minimum bit error rate and sending a selection signal to the transmitter; and
determining a codeword for data transmission according to the selection signal,
wherein the decoding strategy utilizes an ordered successive interference cancellation (OSIC) detection strategy and wherein the receiver utilizes the OSIC to perform an antenna group-wise detection if the codeword candidates to be detected are real-valued symbols.

11. The method as claimed in claim 10, wherein the antenna group-wise detection is performed by the receiver using an average calculation between the real part and imaginary part of each codeword candidate for complex-valued symbols.

12. A communication system having multiple transmit antennas and multiple receive antennas, at least comprising:
a transmitter, providing codeword candidates; and
a receiver, receiving the codeword candidates and determining bit error rates, each corresponding to one of the codeword candidates according to a decoding strategy,
wherein the receiver finds a codeword candidate with the minimum bit error rate and sends a selection signal to the transmitter, and the transmitter determines a codeword for data transmission according to the a selection signal,
wherein the receiver further comprises:
a space-time matched filter (MF), reducing the spatial dimension of encoded signals transmitted by the transmitter;
a detector, detecting the encoded signals; and
a multiplexer, restoring the detected signals to original signals.

13. The communication system as claimed in claim 12, wherein the transmitter further comprises:

a de-multiplexing module, generating multiple data sub-streams according to input data stream;
a modulator, modulating the data sub-streams to multiple modulated symbols;
a grouped space-time block code (G-STBC) encoder, encoding the modulated symbols to perform a grouped space-time code; and
a controller, providing the codeword candidates, and determining the codeword for data transmission according to the selection signal sent from the receiver.

14. The communication system as claimed in claim 12, wherein each of the codeword candidates represents an orthogonal space-time block code (O-STBC).

15. The communication system as claimed in claim 14, wherein each of the codeword candidates employs $N_q$ antennas, with $N_q$ being equal to 2, 3 or 4.

16. The communication system as claimed in claim 15, wherein the antenna numbers of the codeword candidates are different from each other.

17. The communication system as claimed in claim 12, wherein the decoding strategy utilizes an ordered successive interference cancellation (OSIC) detection strategy.

18. The communication system as claimed in claim 12, wherein the decoding strategy utilizes a two-stage detection strategy.

19. A communication system having multiple transmit antennas and multiple receive antennas, at least comprising:
a transmitter, providing codeword candidates; and
a receiver, receiving the codeword candidates and determining bit error rates, each corresponding to one of the codeword candidates according to a decoding strategy,
wherein the receiver finds a codeword candidate with the minimum bit error rate and sends a selection signal to the transmitter, and the transmitter determines a codeword for data transmission according to the a selection signal,
wherein the receiver further comprises:
a space-time matched filter (MF), reducing the spatial dimension of encoded signals transmitted by the transmitter;
a detector, detecting the encoded signals; and
a multiplexer, restoring the detected signals to original signals,
wherein the decoding strategy utilizes a two-stage detection strategy, and wherein the two-stage detection strategy comprises:
detecting the codeword candidates with three or four antennas first; and then
detecting the codeword candidates with two antennas.

20. The communication system as claimed in claim 19, wherein the two-stage detection strategy is performed with a recursive based implementation.

21. The communication system as claimed in claim 12, wherein the detector is a detector that utilizes the OSIC to perform an antenna group-wise detection if the codeword candidates to be detected are real-valued symbols.

22. The communication system as claimed in claim 21, wherein the detector is a detector that that performs the antenna group-wise detection using a average calculation between the real part and imaginary part of each codeword candidate for complex-valued symbols.

* * * * *

UNITED STATES PATENT AND TRADEMARK OFFICE
CERTIFICATE OF CORRECTION

PATENT NO.       : 7,764,745 B2
APPLICATION NO.  : 11/710503
DATED            : July 27, 2010
INVENTOR(S)      : Ho et al.

Page 1 of 1

It is certified that error appears in the above-identified patent and that said Letters Patent is hereby corrected as shown below:

Title Page, Item (73) Assignee's residence:

"Industrial Technology Research Institute, Hsinchu Taiwan (CN)" should be changed to --Industrial Technology Research Institute, Hsinchu (TW)--

Signed and Sealed this
Tenth Day of June, 2014

Michelle K. Lee
*Deputy Director of the United States Patent and Trademark Office*